Dec. 20, 1966 H. JULICH 3,293,527
ELECTRONIC CONTACT FUZE
Filed Sept. 1, 1964
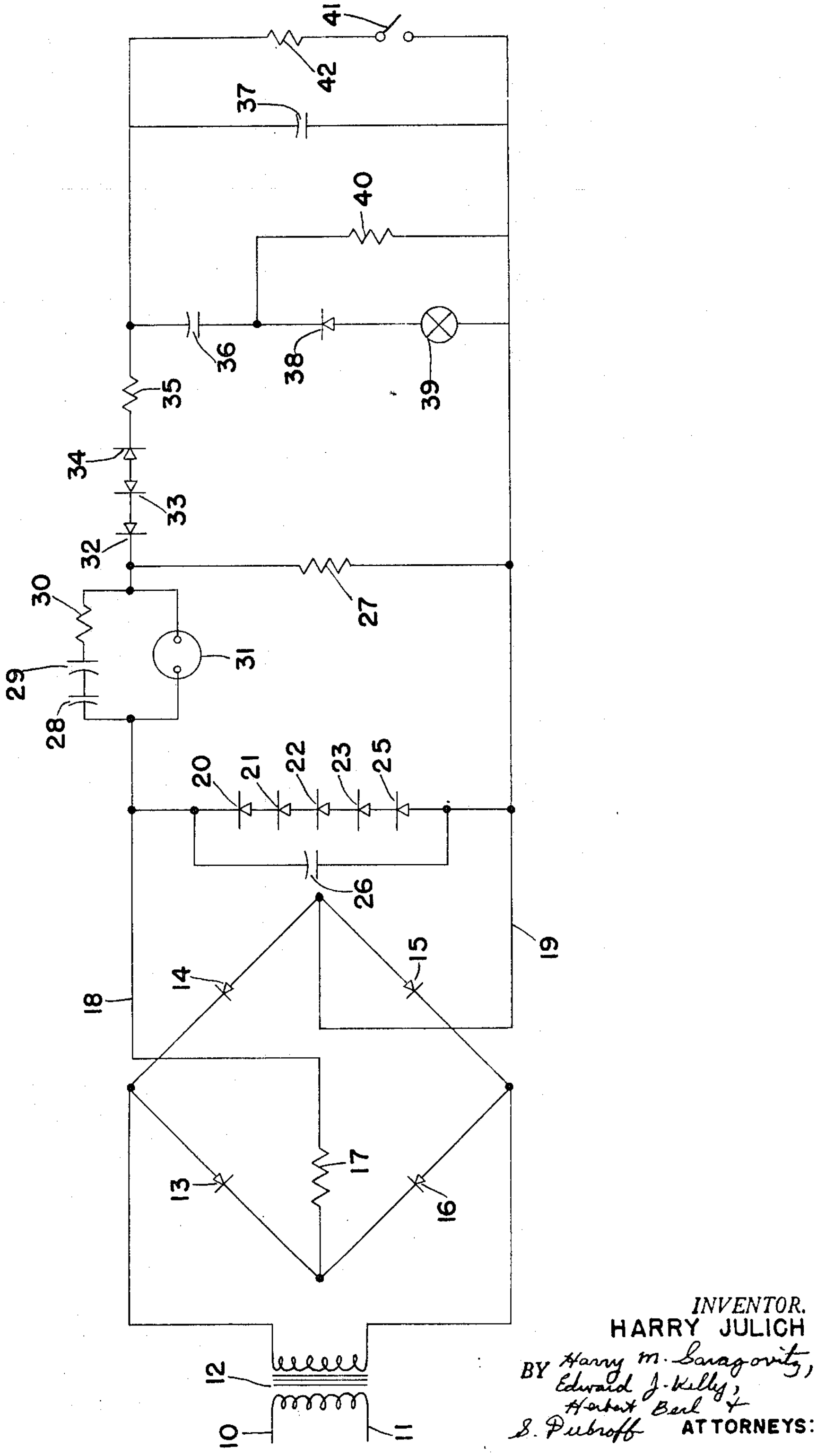
INVENTOR.
HARRY JULICH
BY Harry M. Saragovitz, Edward J. Kelly, Herbert Berl & S. Dubroff
ATTORNEYS:

United States Patent Office 3,293,527

Patented Dec. 20, 1966

3,293,527

ELECTRONIC CONTACT FUZE

Harry Julich, Jamaica, N.Y., assignor, by mesne assignments, to the United States of America as represented by the Secretary of the Army Filed Sept. 1, 1964, Ser. No. 393,794
5 Claims. (Cl. 320—1)

This invention relates to electronic contact fuzes. It provides an improved electronic contact fuze which is unaffected by variation in its input voltage, is armed with a predetermined time delay following its energization, delivers a firing energy of the order of 80,000 ergs, and remains in a safe condition in case of its failure to fire.

In accomplishing these various results, the alternating current input is rectified and clipped thus providing a substantially constant unidirectional voltage. This unidirectional voltage is applied through a resistor to a parallel circuit having in one branch a gas diode and in the other branch a series-connected capacitor and resistor. It is also applied to a zener diode connected between the parallel circuit and the arming circuits of the fuze. When the capacitor is charged to the firing potential of the gas diode, this diode fires. As a result the voltage at the zener diode is increased to a value such that the zener diode conducts current to the arming circuits of the fuze. The primer of the fuze is fired by discharging a capacitor in the arming circuit. If the primer fails to fire, the fuze remains in a safe condition.

The invention will be better understood from the following description when considered in connection with the accompanying drawing and its scope is indicated by the appended claims.

Referring to the drawing,

An alternating voltage is applied from input terminals 10 and 11 through a transformer 12 to a full wave rectifier including zener diodes 13, 14, 15 and 16 and a resistor 17, the resistor 17 being needed for obtaining regulation from the zener diodes. A unidirectional voltage is produced at terminals 18 and 19. Clipping of this unidirectional voltage is effected by zener diodes 20 to 23 and 25 which are shunted by a capacitor 26. As can be readily understood, the diodes 20 to 25 may be replaced by a single zener diode having characteristics equivalent to those of the diodes 20 to 23 and 25.

The clipped unidirectional potential is applied through a resistor 27 to a parallel circuit having in one branch series connected capacitors 28 and 29 and resistor 30 and having in the other branch a gas diode 31. This unidirectional potential is also applied to a zener diode 32 which is connected through zener diodes 33 and 34 and a resistor 35 to firing capacitors 36 and 37. It is of course apparent that the capacitors 28 and 29 may be replaced by a single capacitor of equivalent capacity and that the zener diodes 32 and 33 may be replaced by a single diode having equivalent characteristics.

The resistors 27 and 30 are so chosen that the initial voltage falls below the zener voltage of diodes 32 and 33 and also below the firing potential of the gas diode 31. When the capacitors 28 and 29 have charged up to the firing potential of the gas diode 31, this gas diode acts as a low impedance path and the applied voltage less the glow voltage of diode 31 appears across the resistor 27. This voltage is higher than the zener voltage of diodes 32 and 33. As a result, diodes 32 and 33 break down, allowing quick energization of capacitors 36 and 37 and putting the fuze into its armed condition. The purpose of the reversely connected zener diode 34 is to block relaxations in the circuit.

Capacitors 36 and 37 charge up at practically the same time, the charging current of capacitor 36 being drawn through a resistor 40 which shunts a series-connected primer 39 and zener diode 38. As a result, the difference in the potentials of the two capacitors is always less than the zener voltage of the diode 38 so that no current passes through the primer 39.

Connected in shunt to the capacitor 37 are triggering means shown as a resistor 42 and a switch 41. The resistor 42 is much smaller than the resistor 40. The fuze is fired upon closure of the switch 41 by impact or otherwise. Such closure discharges the capacitors 36 and 37 through the resistor 42, the discharging current following the less resistant path through the primer 39 and the *forward* resistance of the zener diode 38.

The constants of the various components of the fuze are shown in the following tabulation, the identifying reference numerals being listed in the first column.

| | |
|---|---|
| **13 14 15 16** | National semi-conductor, in 221. |
| **20 21 22 23** | National semi-conductor, in 210. |
| **25** | National semi-conductor, in 221. |
| **31** | GE gas diode XB–3. |
| **32 33** | National semi-conductor, in 206. |
| **34** | National semi-conductor, in 221. |
| **38** | Raytheon, in 438. |
| **26** | 0.1 μf. Astron, paper. |
| **28 29** | G.E. tantalytic 29F, 469, 1 μf, 150 v. D.C. |
| **36 37** | G.E. tantalytic 29F, 447, 4 μf, 150 v. D.C. |
| **17** | Carbon, 220K ±10%, ½ w. |
| **30** | Carbon, 18 meg. ±10%, ½ w. |
| **27** | Carbon, 8.2 meg. ±10%, ½ w. |
| **35** | Carbon, 8K ±10%, ½ w. |
| **40** | Carbon, 1K ±10%, ½ w. |
| **42** | Carbon, 5Ω ±10%, ½ w. (2 10Ω in parallel). |
| **12** | Microtran vm. 5. |
| **39** | Thermocouple, 3Ω. |
| **41** | Push button switch. |

As previously indicated, the diodes 20 to 23 and 25 may be replaced by a single equivalent, diode, the capacitors 28 and 29 may be replaced by a single equivalent capacitor, and the diodes 32 and 33 may be replaced by a single equivalent diode.

I claim:

1. In an electronic contact fuze, the combination of
means for applying an A.C. voltage,
means for rectifying said A.C. voltage,
means for clipping said rectified voltage to produce a substantially constant unidirectional voltage,
a parallel circuit having in one of its branches a gas diode and in the other of its branches a series-connected capacitor and first resistor,
a second resistor,
a fuze arming circuit,
a zener diode connected between said parallel circuit and said arming circuit, and
means for applying said unidirectional voltage through said second resistor to said parallel circuit and to said zener diode, the values of said first and second resistors being so related that after a predetermined time delay said capacitor is charged to the firing voltage of said gas diode and voltage is applied through said zener diode to said fuze arming circuit.

2. In an electronic contact fuze, the combination of
means for applying a substantially constant unidirectional voltage,
a parallel circuit having in one of its branches a gas diode and in the other of its branches a series-connected capacitor and first resistor,
a second resistor,
a fuze arming circuit, a zener diode connected between said parallel circuit and said arming circuit, and means for applying said unidirectional voltage through said second resistor to said parallel circuit and to said zener diode, the values of said first and second resistors being so related that after a predetermined time delay said capacitor is charged to the firing voltage of said gas diode and voltage is applied through said zener diode to said fuze arming circuit.

3. In an electronic contact fuze, the combination of means for applying an A.C. voltage, means for rectifying said A.C. voltage, means for clipping said rectified voltage to produce a substantailly constant unidirectional voltage, a parallel circuit having in one of its branches a gas diode and in the other of its branches a series-connected capacitor and first resistor, a second resistor, a fuze arming circuit, a pair of reversely-connected zener diodes connected between said parallel circuit and said arming circuit, and means for applying said unidirectional voltage through said second resistor to said parallel circuit and to said zener diode, the values of said first and second resistors being so related that after a predetermined time delay said capacitor is charged to the firing voltage of said gas diode and voltage is applied through said zener diode to said fuze arming circuit.

4. In an electronic contact fuze, the combination of means for applying a substantially constant unidirectional voltage, a first parallel circuit having in one of its branches a gas diode and in the other of its branches a series-connected first capacitor and first resistor, a second resistor, an arming circuit including second and third capacitors, said second capacitor being connected in series with a second parallel circuit having in one branch a third resistor and in the other branch a series-connected first zener diode and primer and said third capacitor being connected in shunt to said second capacitor and said second parallel circuit, a second zener diode connected between said first parallel circuit and said second and third capacitors, and means for applying said unidirectional voltage through said second resistor to said first parallel circuit and to said second zener diode, the values of said first and second resistors being such that after a predetermined time interval said first capacitor is charged to the firing voltage of said gas diode and voltage is applied through said second zener diode to said second and third capacitors.

5. In an electronic contact fuze, the combination of means for applying a substantially constant unidirectional voltage, a first parallel circuit having in one of its branches a gas diode and in the other of its branches a series-connected first capacitor and first resistor, a second resistor, an arming circuit including second and third capacitors, said second capacitor being connected in series with a second parallel circuit having in one branch a third resistor and in the other branch a series-connected first zener diode and primer and said third capacitor being connected in shunt to said second capacitor and said second parallel circuit, a second zener diode connected between said first parallel circuit and said second and third capacitor, means for applying said unidirectional voltage through said second resistor to said first parallel circuit and to said second zener diode, the values of said first and second resistors being such that after a predetermined time interval said first capacitor is charged to the firing voltage of said gas diode and voltage is applied through said second zener diode to said second and third capacitors, and triggering means connected in shunt to said third capacitor, said triggering means including a switch and a fourth resistor which has a substantially smaller value than said third resistor.

References Cited by the Examiner

UNITED STATES PATENTS

| | | | |
|---|---|---|---|
| 3,028,528 | 4/1962 | Ghiselin | 317—80 |
| 3,034,037 | 5/1962 | Heightman et al. | 320—1 X |
| 3,171,063 | 2/1965 | Hutchinson et al. | 317—80 |
| 3,225,695 | 12/1965 | Kapp et al. | 317—80 |

RICHARD M. WOOD, *Primary Examiner.*

V. Y. MAYEWSKY, *Assistant Examiner.*